J. G. LAMB & T. H. WHITE.
APPARATUS FOR DISPLAYING AND STORING CURTAINS AND OTHER ARTICLES.
APPLICATION FILED AUG. 6, 1908.

915,610.

Patented Mar. 16, 1909.
3 SHEETS—SHEET 1.

J. G. LAMB & T. H. WHITE.
APPARATUS FOR DISPLAYING AND STORING CURTAINS AND OTHER ARTICLES.
APPLICATION FILED AUG. 6, 1908.

915,610.

Patented Mar. 16, 1909.
3 SHEETS—SHEET 2.

J. G. LAMB & T. H. WHITE.
APPARATUS FOR DISPLAYING AND STORING CURTAINS AND OTHER ARTICLES.
APPLICATION FILED AUG. 6, 1908.
915,610.
Patented Mar. 16, 1909.
3 SHEETS—SHEET 3.
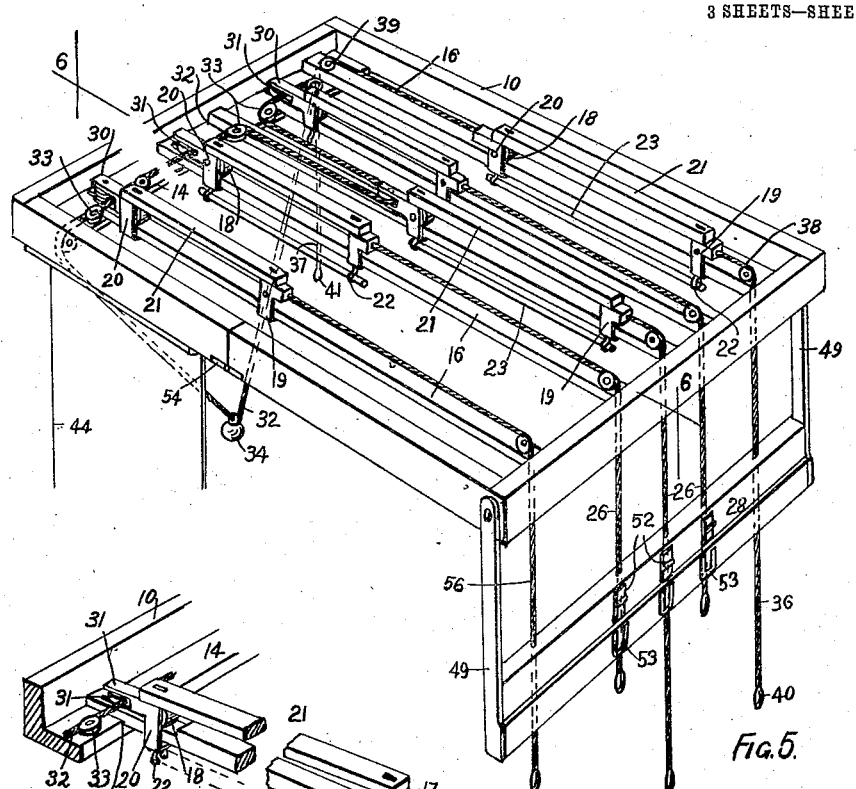

UNITED STATES PATENT OFFICE.

JAMES GODDARD LAMB AND THOMAS HENRY WHITE, OF SYDNEY, NEW SOUTH WALES, AUSTRALIA.

APPARATUS FOR DISPLAYING AND STORING CURTAINS AND OTHER ARTICLES.

No. 915,610.  Specification of Letters Patent.  Patented March 16, 1909.

Application filed August 6, 1908. Serial No. 447,326.

*To all whom it may concern:*

Be it known that we, JAMES GODDARD LAMB and THOMAS HENRY WHITE, subjects of the King of Great Britain, residing at 220 Clarence street, Sydney, in the State of New South Wales, Commonwealth of Australia, have invented certain new and useful Improvements in Apparatus for Displaying and Storing Curtains and other Articles, of which the following is a specification.

This invention has reference to improvements in apparatus for displaying and storing curtains and other articles which it is desirable to exhibit in a hanging position its object being to simplify the apparatus therefor.

According to the invention a rectangular frame is suspended at a suitable height above the floor and across it longitudinally are secured a series of laths or rods or the like of sufficient length to carry two widths of any article to be shown. The articles are preferably attached to rods, strips of canvas or the like which are secured to or suspended from bridge pieces or carriers which travel on the said laths so as to be capable of being drawn freely along same by means of cords one for each article for the purpose of drawing same out toward the front of the apparatus to the display position. An endless cord at the rear end is attached to all the articles or the carriers supporting them and preferably has a weight attached thereto so as to rapidly return an article to its original position, or a spring may be provided for the same object.

The apparatus is preferably so made that if an article is drawn out by means of its operating cord for display purposes any article already out is automatically returned to its normal position, and consequently only one article may be displayed at a time.

An indicator is provided for identifying each article displayed and when required the whole of the articles if not of a rigid nature may be raised from a hanging position and protected by means of a suitable cover.

Figure 1:
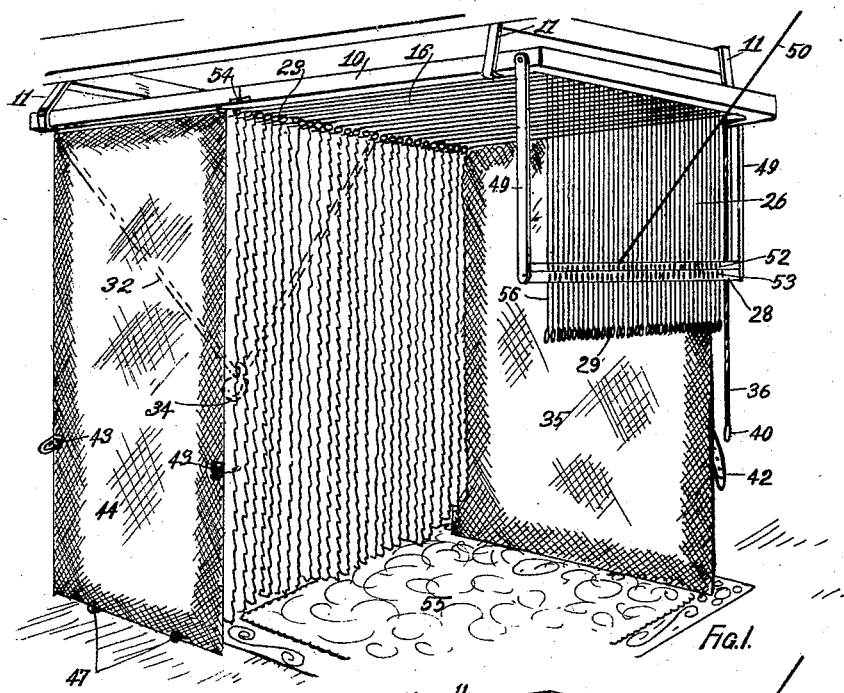
Figure 2:
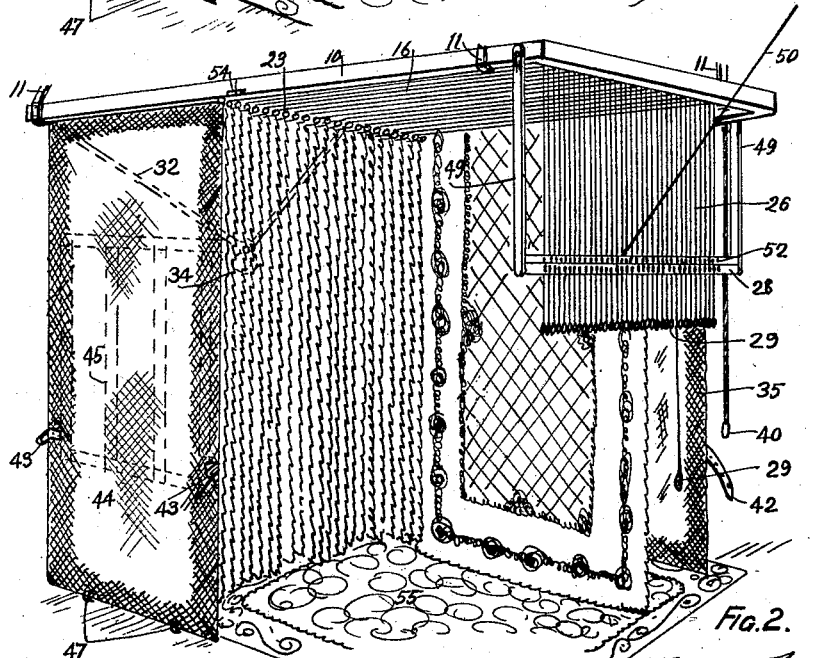
Figure 3:
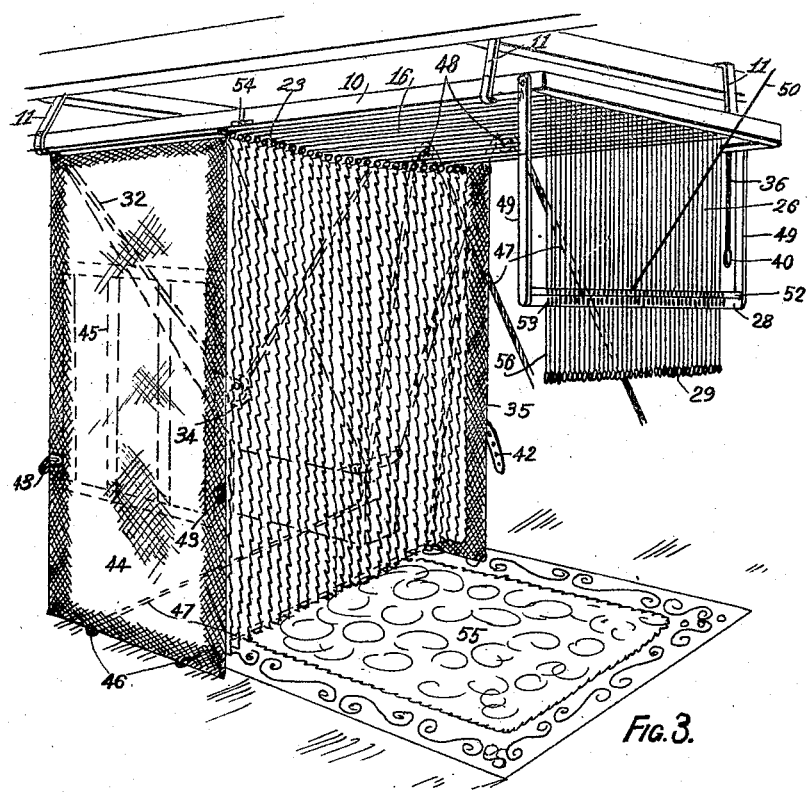
Figure 4:
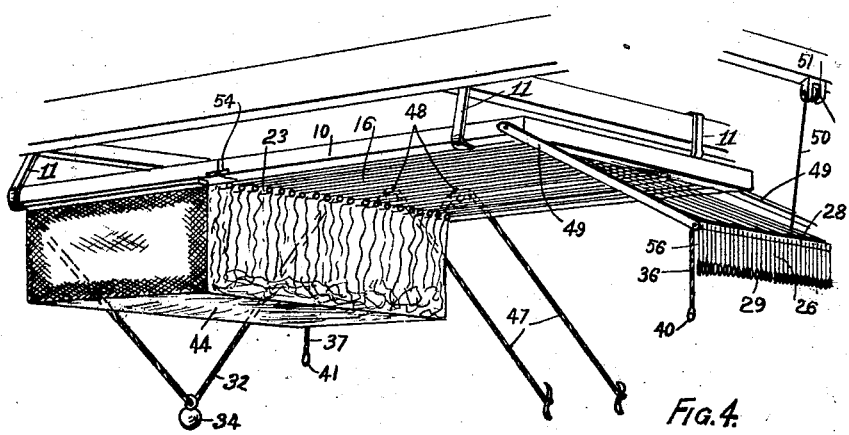

But in order that the invention may be readily comprehended, reference will now be made to the drawings herewith, in which, Figure 1 is a perspective view of the device ready for displaying the articles which in this example are curtains. Fig. 2 is a similar view with a curtain exhibited. Fig. 3 shows a further similar view ready for closing up. Fig. 4 is a perspective view of the device out of use. Fig. 5 is an enlarged perspective view of the framing showing a part of the trolley laths and carriers. Fig. 6 is a section on plane 6—6 Fig. 5. Fig. 7 is an enlarged perspective view of the indicator and ticket holder. Figs. 8 and 9 are detail views of the roller brackets.

The rectangular framing 10 is supported by straps 11 or other means to the ceiling and has plates 14 having recesses 15 for the trolley laths 16. On each trolley lath 16 is a step end 13 and a pair of rollers 17—18 in brackets 19—20 held in position by the bridge piece 21. These brackest 19—20 have depending from the lower extremity a clip 22 to which is affixed the rod 23 carrying the curtain. The bracket 19 has an extension 24 having a slot 25 in which takes the pull rope 26 with its end cap and passes over a sheave 27 on the framing 10 downwardly through the indicator board 28 and ending in an operating handle 29. The other bracket 20 has also a similar extension 24 with a slot 25 and in which takes a U shaped clip 30 having a pulley 31 taking against an endless rope 32 which bears against a row of pulleys 33 and is provided with a weight 34. The trolley lath 16 has a step end 13 to receive the roller 18 and thus lessens the strain on the endless rope 32.

The back ground screen 35 is fastened to a carrier similar in construction to that used for the curtains but the extensions used on the brackets are the same as shown in Fig. 9, and affixed to these are the pull ropes 36—37 passing over sheaves 38 and 39 and ending in operating handles 40 and 41. This screen 35 has straps 42 taking into the buckles 43 on the covering screen 44 that is fastened to the framing 10. The covering screen 44 has a lath framing 45 so that when it is hoisted up it will give a box like appearance as in Fig. 4.

To the bottom of the covering screen are eye holes 46 to which are fastened the ropes 47 that pass over sheaves 48 fastened to the ceiling.

The indicator board 28 is hinged to the framing by the radial arms 49 and has a rope 50 passing over sheave 51 secured to the ceiling so as to hoist it up into the position shown in Fig. 4.

The indicating board has indicators 52 for the purpose of identifying any particular curtain and the board has also card holders 53 bearing the respective numbers of the curtains and also other information. The framing has hinges 54 and the lathing in the cover screen being immovable the whole device can thus be readily transported.

In operation the device is lowered from the position shown in Fig. 4 to the position shown in Fig. 1 and the floor covering 55 being laid the back ground screen is drawn forward by the handle 40 of rope 36. The curtains are then pulled out as desired and as a curtain is drawn forward its carrier draws forward the endless rope thus lifting the weight 34 so that when any next desired curtain is drawn forward the curtain that has been exhibited will be drawn back automatically as shown in Fig. 5. When the remaining last displayed curtain has been exhibited it is drawn back by operating the pull rope 56 connected to the idle lath carrier. If it is desired to inspect certain curtains that have already been exhibited, the indicator 52 is lowered as shown in dotted lines in Fig. 7 opposite the respective curtain. When the display of curtains is finished the back ground screen is drawn back by the handle 41 on rope 37 and the straps 42 fastened to the buckles 43 on the cover screen 44 as shown in dotted lines in Fig. 3, the whole is then hoisted up by the rope 47 into the position shown in Fig. 4 as well as the indicator board.

Having thus described our invention, what we claim as new and desire to secure by Letters Patent is:—

1. In display racks for curtains and the like, in combination, a support, means for hanging a plurality of curtains therefrom, means associated with each curtain whereby the same may be moved to a position for display, and means common to all of said last named means for restoring one or more of the same from the position for display to normal position.

2. In display racks for curtains and the like, in combination, a support, hanger members associated therewith, a curtain carrier mounted on each hanger member, pulleys provided on the rear ends of said carriers, pulleys provided on the support between the carriers, an endless cord passed over all of said pulleys, and a controlling weight carried by said cord, each carrier being movable on its hanger member to a position of display and being returned to normal position by the influence of said weight transmitted through said cord.

3. In display racks for curtains and the like, in combination, a support, hanger members associated therewith, a curtain carrier mounted for movement on each hanger member and a pull cord connected to each carrier, said pull cords having end portions pendent from said support, a rigid transverse member common to all of said pendent end portions, and having openings through which said end portions extend, pendent rigid arms pivoted to the front end of the support and carrying said transverse member, and means for raising and lowering the latter in an arc like path described by said arms, movement of the said member in either direction simultaneously raising or lowering all of said pendent portions.

4. In display racks for curtains and the like, in combination, a rectangular support made in hinged sections arranged to fold one upon the other, each section having a transverse supporting plate, hanger members extending between said plates and removably supported thereby and a curtain carrier associated with each hanger member.

5. In display racks for curtains and the like, in combination, a support, a hanger member associated therewith, a curtain carrier movable on said hanger, a pull cord for imparting movement to said curtain carrier, and a two-part coupling means for connecting said pull cord to said carrier and including a member on the carrier, and a companion member on the pull cord constructed to permit of the instantaneous manual engagement and disengagement of said pull cord with respect to said carrier.

6. In display racks for curtains and the like, in combination, a support, means for hanging a plurality of curtains therefrom, a covering screen arranged to be pulled up to partially inclose and compress the curtains, and a lath frame provided on said covering screen and serving to impart a box-like appearance thereto when the covering screen is pulled up.

7. In display racks for curtains and the like, in combination, a support, hanger members associated therewith, and a curtain carrier movably mounted on each hanger member and comprising two brackets and a member connecting said brackets, each bracket comprising an open substantially rectangular member having a projection for engagement with said connecting member, a bridge part bearing upon the hanger member, and a pendent supporting clip.

In testimony whereof we have hereunto set our hands in presence of two subscribing witnesses.

JAMES GODDARD LAMB.
THOMAS HENRY WHITE.

Witnesses:
CHARLES EDWARD GRAHAM,
HENRY WATCHORNE CLARKE